UNITED STATES PATENT OFFICE.

HENRY CARL FEHRLIN, OF ST. LOUIS, MISSOURI.

PROCESS OF PURIFYING ACETANILID.

SPECIFICATION forming part of Letters Patent No. 615,828, dated December 13, 1898.

Application filed March 19, 1898. Serial No. 674,492. (No specimens.)

*To all whom it may concern:*

Be it known that I, HENRY CARL FEHRLIN, doctor of philosophy, a citizen of the Republic of Switzerland, residing at St. Louis, State of Missouri, have invented certain new and useful Improvements in Processes of Purifying Acetanilid, of which the following is a full, clear, and exact description, which will enable others skilled in the art to which it appertains to use the same.

In chemical literature it is stated that acetanilid distils without decomposition at a temperature of 295° or 296° Celsius. These statements are incorrect, inasmuch as acetanilid decomposes at these temperatures if distilled in the usual way—that is, by itself under atmospheric pressure—as can easily be ascertained by titrating the acetic acid and anilin-oil produced by the destructive distillation, with phenolphtalein and Congo red as indicators. On account of this decomposition it is practically impossible to purify the crude acetanilid by distillation in the usual way—namely, by itself under atmospheric pressure. The sublimation of crude acetanilid, as proposed in some of the works on this subject, is still more irrational, and the usual way of purifiying acetanilid is therefore to subject the crude acetanilid after the uncombined acetic acid and anilin-oil have been removed from it in one of the well-known ways to as many crystallizations as are necessary to finally obtain it in the form of pure white crystal.

I have now discovered that acetanilid distils undecomposed in a current of superheated vapors of acetic acid. This discovery not only allows of a new and very useful way of separating the uncombined anilin-oil from the acetanilid, inasmuch as the elimination of the uncombined anilin-oil is effected much quicker by such a current of superheated vapors of acetic acid than by any other way heretofore known, but the distillation of the acetanilid itself under such conditions reduces the cost of purifying the crude acetanilid enormously, because the great expenses involved in the repeated crystallizations which were heretofore necessary to obtain a good product are entirely dispensed with, as the acetanilid crystallizes out of the acidulous distillate in the form of crystals of a purity and size as are very seldom obtained even by a series of the usual refining operations. Thus it will be seen that the whole refining apparatus necessary to carry out my process takes up but very little room and dispenses with large buildings heretofore necessary for the crystallization.

In carrying out my process I first eliminate the uncombined anilin-oil from the crude acetanilid by the action of a current of superheated vapors of acetic acid at a temperature of about 180° Celsius and then continue the distillation, preferably under diminished pressure, by increasing the temperature of the material to that of the boiling-point of acetanilid at said pressure and simultaneously passing a current of superheated vapors of acetic acid of any convenient strength through the same of a temperature not lower than the boiling-point of acetanilid at the vacuum used, so that active distillation of the acetanilid is effected.

If very strong acetic acid has been used for the distillation, part of the acetanilid is dissolved in the distillate, from which, upon dilution with water, it is immediately precipitated in the form of pure white crystals. If such a solution as acetanilid in strong acetic acid is left to crystallize, unusually large crystals are obtained, which are absolutely colorless and transparent, while the crystals obtained from the usual refining operations are white and opaque. In the latter form the acetanilid also comes over with the distillate; but the crystals are of much larger size and of greater brilliancy.

The method thus described of producing a perfectly pure product from crude acetanilid is the best at present known to me; but I wish to state that it is not at all necessary to apply diminished pressure to distil the acetanilid, the essence of my invention or discovery being that if acetanilid is subjected to the action of a current of superheated vapors of acetic acid it distils undecomposed and that a faultless product is obtained no matter whether the distillation is effected under atmospheric pressure or under vacuum, the two methods differing only in the length of time necessary to complete or finish the operation.

Having thus fully described my invention, what I claim as new, and desire to secure by Letters Patent, is—

1. The process of purifying acetanilid which consists in separating the uncombined anilin-oil from the crude acetanilid by subjecting the same to the action of a current of superheated vapors of acetic acid of a temperature of about 180° Celsius until all the anilin-oil is removed, substantially as described.

2. The process of purifying crude acetanilid which consists in distilling the acetanilid itself (preferably under diminished pressure) by the action of a current of superheated vapors of acetic acid of a temperature not lower than the boiling-point of acetanilid at the vacuum used, substantially as described.

3. The process of purifying acetanilid which consists in first eliminating the uncombined anilin-oil from the crude acetanilid by the action of a current of superheated vapors of acetic acid of a temperature of about 180° Celsius, continuing the distillation preferably under diminished pressure by increasing the temperature of the material to that of the boiling-point of acetanilid at said pressure, and simultaneously passing a current of superheated vapors of acetic acid of any convenient strength through the same at a temperature not less than the boiling-point of acetanilid at the vacuum used whereby active distillation of the said acetanilid is effected, substantially as described.

In testimony whereof I affix my signature in the presence of two witnesses.

HENRY CARL FEHRLIN.

Witnesses:
ALFRED A. MATHEY,
C. F. KELLER.